Patented Sept. 19, 1922.

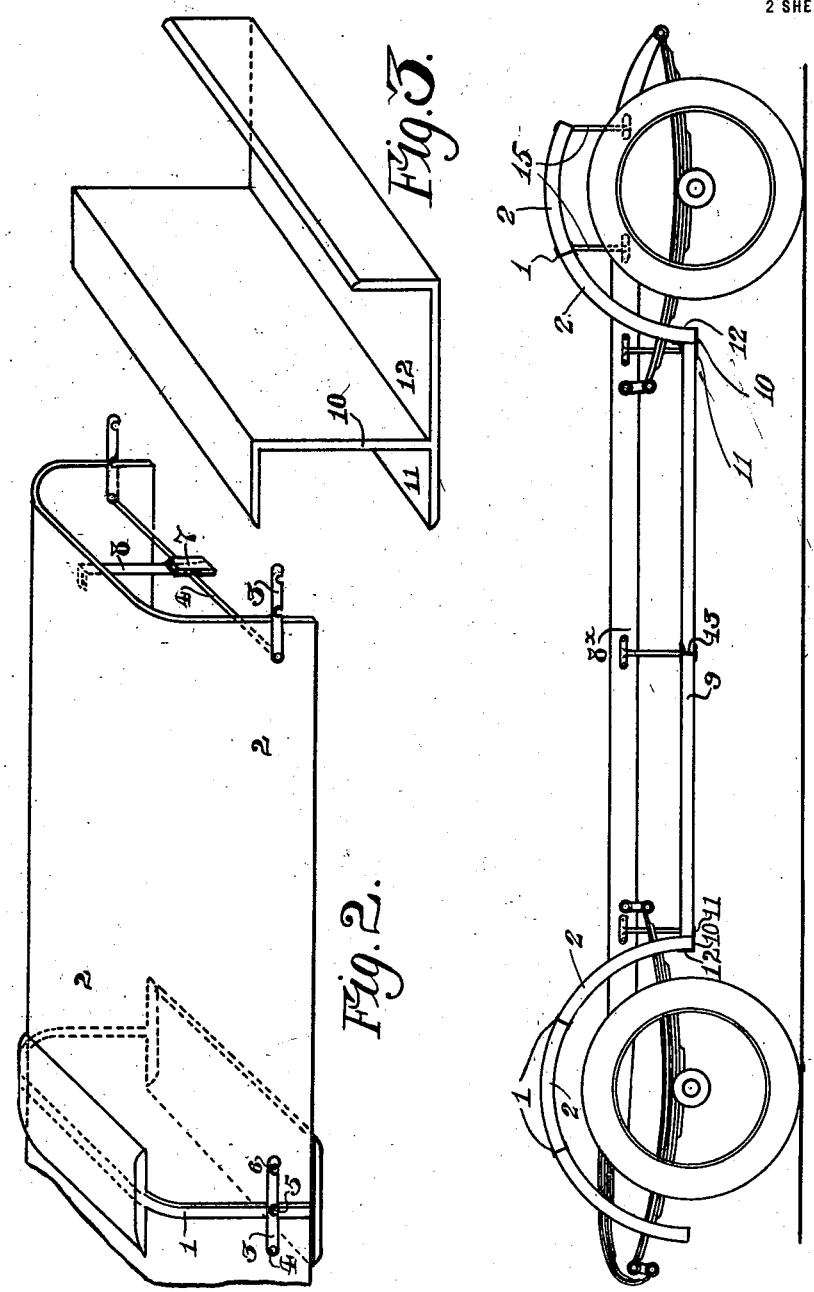

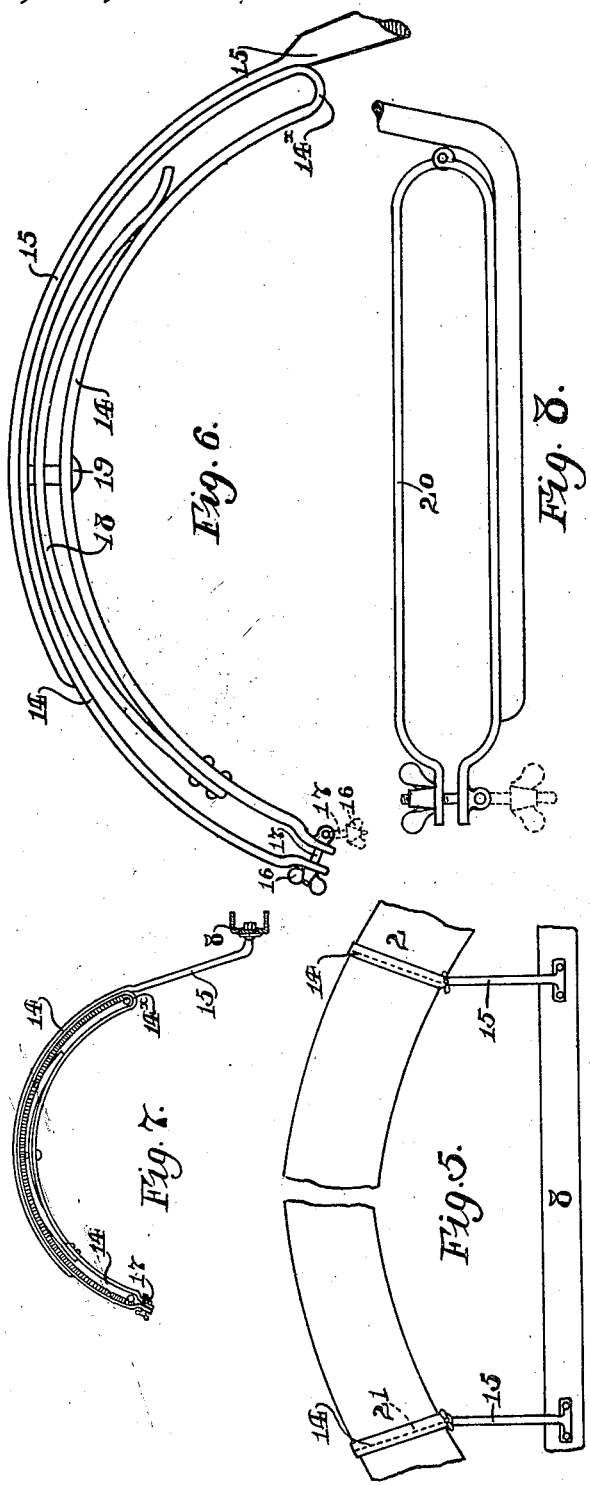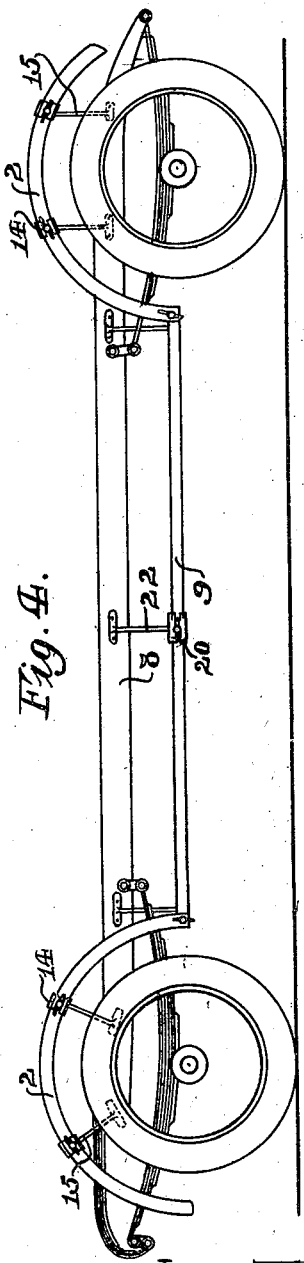

1,429,496

UNITED STATES PATENT OFFICE.

WILLIAM FAIRCLOUGH, OF WIGAN, ENGLAND.

MUD OR SPLASH GUARD FOR VEHICLES.

Application filed May 26, 1919. Serial No. 299,783.

*To all whom it may concern:*

Be it known that I, WILLIAM FAIRCLOUGH, a subject of the King of Great Britain, residing at Wigan, in the county of Lancaster and Kingdom of England, have invented certain new and useful Improvements in Mud or Splash Guards for Vehicles, of which the following is a specification.

This invention has reference to the mud or splash guards of automobiles or other vehicles for keeping wet and dirt (projected by the wheels when running), from reaching the occupants of such vehicles, and for keeping the dress from rubbing against the wheels in entering or alighting.

These guards have hitherto been fixed permanently in position, so that when the mud collected by them dries and hardens it is often a difficult matter to remove it. For instance it is often necessary for cleaners to kneel on the ground or even lie on their backs in order to scrape or wash it off in situ. This produces dust and grit which falls onto and into the axle bearings. Furthermore these fixed mud guards form a serious obstruction which prevents an attendant having free access to certain parts of the vehicle for cleaning the same, and they are also more or less of an obstruction when it is desired to remove the tires to repair punctures. A vehicle may sometimes have to lie idle for days awaiting repairs to damaged or worn mudguards.

My invention is designed to provide a mud or splash guard which can be readily removed and replaced, and so avoid the disadvantages above referred to.

My mud or splash guards comprise in combination metallic brackets or slips permanently secured to the vehicle at spaced intervals apart, and mud or splash guard units adapted to be slid in between the said brackets and be engaged thereby at the ends. Each mud guard may comprise a single unit, or a plurality of separate ones which can be assembled together to form a complete guard, any of these units being removable without disturbing the others or all being removable.

The invention will be understood from the following description, reference being had to the accompanying drawings in which:—

Figure 1 is a side elevation of the chassis of an automobile with my mud guard applied thereto, Figure 2 is a detail view on a larger scale of part of one of the mud guards shown in Figure 1, and Figure 3 is a detail view of one of the brackets or slips.

Figure 4 to 8 show a modification of the constructional arrangement of the mud guard and the brackets for supporting it. Figure 4 being a side view of the chassis of an automobile with my mud guards applied thereto, Figure 5 a side view of part of one of the mud guards on a larger scale, Figure 6 an edge view of one of the brackets or slips before the mud guard segments are inserted therein, Figure 7 a similar view on a smaller scale with a mud guard segment in position and Figure 8 an edge view of one of the brackets for the foot board.

Each segment or unit rests at the ends in metallic brackets or slips which are permanently secured to the vehicle and project laterally therefrom. In one form, these brackets or slips 1 which are fixed at suitable intervals apart, are H or twin channel shape in cross section as shown in Figures 1 and 2, that is to say each bracket has two channels projecting opposite ways with a web between, and the length of the mud guard segments 2 is made to coincide with the distance that the brackets or slips 1 are spaced apart, so that they can be slid edgewise into the channels, and be held therein by the tightness of their fit or by catch devices such as 3. In the arrangement shown these catch devices consist of arms 3 pivoted at 4 to the mud guard segments 2 and adapted to engage studs 5 on the brackets 1 and studs 6 on the adjacent mud guard segments so that the mud guard segments are firmly secured to the fixed brackets 1, but can be removed whenever required. The pivotal pins 4 to which the catch arms 3 are secured pass right across the mud guard segments 2 and through perforations therein to the outside, and at or about the middle of their length they are squared or flattened at 7. Against this flattened part 7 the lower end of a fixed spring strip 8 presses the tendency of this spring being to keep the catch arms in engagement with the studs 5 and 6 and prevent their becoming disengaged by vibration. For the purposes of illustration the mud guard segments 2 illustrated in Fig. 2 are shown straight, but it will, of course, be understood that where the guards are curved, as shown in Fig. 1 they will take such curved form and the brackets 1 made to correspond therewith. 8ˣ is the main frame of the chassis, 9 the foot board or running board of the vehicle; and 10 are supplementary fixed brackets of twin channel shape in cross section, one of these channels 11 being adapted to receive the end of the running board and the other channel 12 adapted to receive the corresponding end of one of the mud guard segments. The foot board 9 is made in two lengths, the adjacent ends engaging the twin channel brackets 13. If desired the brackets 1 might be inverted T shape in cross section, the ends of the segments resting on the cross piece of the T, while the upstanding member of the T is split into two webs which are turned over in opposite directions to clip the ends of adjacent segments. By this invention any one or more of the segments 2 can be removed either for cleaning, or to give access to the part of the vehicle behind it, by disengaging the catches 3 from the studs, and the segments 2 can then be drawn out sideways of the vehicle, and replaced whenever required. The objection to a rigid non-removable guard which has to be cleaned in situ, and is apt to obstruct access to the parts behind it, is altogether avoided, and the segments removed can be taken completely away from the vehicle and washed by immersion in a washing receptacle.

In the modification shown in Figures 4 to 8 the brackets or slips take the form of clamps 14 fixed by arms 15 to the main frame 8 of the chassis. These clamps 14 consist of two strips or blades 14 united by a steel bow 14ˣ at one end which makes them self-opening, when the nut 16 at the other end is slackened and the hinged bolt 17 turned so as to lie clear as shown by the dotted lines. When the bolt is turned clear, the ends of the mud guard segments 2 can be slid edgewise into these clamps, the length of the segments being coincident with the distance apart of the clamps. The bolts 17 are then turned on their pivots and the nuts 16 tightened up so as to clamp the mud guard 2 between the two strips 14. A plate spring 18 is provided between the strips to prevent the mud guard segments 2 from rattling. The adjacent ends of two mud guard segments 2 are held in each clamp 14 and longitudinal movement of the segments is prevented by a stop pin 19 secured to the lower of the two strips or blades 14 but quite unconnected with the upper one. An indent at each end of the mud guard segments 2 engages the stop pins 19. The meeting ends of the mud guard segments are shown by the dotted lines 21. The foot board or running board 9 is made in two lengths also, each length resting at the end and being clamped in clamps 20 which are similar to the clamps 14 except that they are straight instead of curvilinear. The clamps are suspended from the frame 8 by the brackets 22. The running board of course acts not only as a foot board, but also as a splash board.

I declare that what I claim is:—

1. A mud or splash-guard for road vehicles comprising, in combination, two brackets or slips having upper and lower limbs and permanently secured to the vehicle at a spaced interval apart, and a single mud-guard unit of a length corresponding to the distance between the brackets and adapted to be slid in between the limbs of said brackets, so as to be engaged thereby at the ends, but removable therefrom when required.

2. A mud or splash-guard for road vehicles comprising, in combination a plurality of brackets or slips having upper and lower limbs and permanently secured to the vehicle at spaced intervals apart, and mud-guard units or segments of a length corresponding to the distance between the limbs of said brackets and engaged thereby at the ends so as to form collectively a complete guard but removable therefrom when required.

3. A mud or splash-guard for road vehicles, comprising in combination, brackets or slips of twin channel shape in cross section which are secured permanently to the vehicle at spaced intervals apart, and mud-guard units of a length corresponding to the distance between the brackets and adapted to be slid in between the said twin channel brackets so as to be engaged thereby at the ends.

4. Mud or splash guards comprising mud guard units or segments, and brackets or slips fixed permanently in position between which the units can be slid laterally, the said brackets consisting of two strips or blades united by a steel bow at one end so as to be self opening, the opposite end being provided with a bolt by which the strips can be closed together when a unit has been slid between them.

5. A mud or splash guard comprising in combination running board units, mud guard units, and brackets or slips of two channel shape in cross section, one of these channels being adapted to receive the end of the running board, and the other channel adapted to receive the end of a mud guard segment.

6. A mud or splash guard comprising in combination mud guard units or segments and brackets or slips fixed permanently in position between which the units can be slid laterally, the said brackets consisting of two strips or blades united by a steel bow at one end so as to be self opening and a closing bolt at the other end, and a plate spring inserted between the two strips or blades to keep the mud guard from rattling.

7. A mud or splash guard comprising in combination mud guard units or segments and brackets or slips fixed permanently in position between which the segments can be slid laterally, the said brackets consisting of two strips united by a steel bow at one end so as to be self opening and provided with a bolt at the other end and a stop pin 19 secured to one of the strips to prevent longitudinal movement of the mud guard units.

In witness whereof I have hereunto signed my name this 30th day of April, 1919, in the presence of two subscribing witnesses.

WILLIAM FAIRCLOUGH.

Witnesses:
G. C. DYMOND,
J. McLACHLAN.